US005636723A

United States Patent [19]

Bulle et al.

[11] Patent Number: 5,636,723

[45] Date of Patent: Jun. 10, 1997

[54] GUIDE DEVICE FOR A DISTRIBUTIVE CONVEYOR ARRANGEMENT

[75] Inventors: Bernd Bulle, Allensbach; Erich Grögor, Konstanz, both of Germany

[73] Assignee: Licentia Patent-Verwaltungs-GmbH, Frankfurt am Main, Germany

[21] Appl. No.: 440,928

[22] Filed: May 15, 1995

[30] Foreign Application Priority Data

May 13, 1994 [DE] Germany .......................... 44 16 893.4

[51] Int. Cl.[6] .................................................. B65G 47/46

[52] U.S. Cl. ........................................ 198/367.1; 198/367

[58] Field of Search ................................ 198/367, 367.1, 198/370.01, 406, 442; 193/2 R, 8, 14

[56] References Cited

U.S. PATENT DOCUMENTS

| | | | |
|---|---|---|---|
| 3,128,872 | 4/1964 | Gaitten | 198/367 |
| 3,465,870 | 9/1969 | Paulsen | 198/367 |
| 4,047,712 | 9/1977 | Burkhardt et al. | 198/367 X |
| 4,193,489 | 3/1980 | Siniscal | 198/406 |
| 5,340,099 | 8/1994 | Romanenko et al. | 198/367 X |
| 5,340,100 | 8/1994 | Romanenko | 198/367 X |

FOREIGN PATENT DOCUMENTS 25 23 835 11/1978 Germany .

*Primary Examiner*—D. Glenn Dayoan
*Attorney, Agent, or Firm*—Spencer & Frank

[57] ABSTRACT

A guide device for moving flat pieces of mail from a conveyor and stacking the mail. The conveyor has a shunt for diverting mail to the guide device. The guide device includes a curved support surface and an outer lateral wall defining a curved deflection surface. The outer lateral wall has an upper portion, a lower portion having an outlet area, and an essentially spherically shaped transition area for moving the pieces of mail from an essentially vertical position into an essentially horizontal position. The upper portion of the outer lateral wall has a height essentially equal to a height of the shunt. The upper portion of the wall adjoins the conveyor, and extends at an acute angle relative to the conveying direction. The upper portion of the wall is level along a length equal to a distance between an inner end point of the outlet area and a vertical line passing through a beginning point of the outer lateral wall. An area of the outer lateral wall corresponding to the outlet area forms a perpendicular angle relative to the conveying direction. The curved support surface and the outlet area form an outlet conduit having a narrowest width equal to a maximum height of the pieces of mail to be moved. The guide device includes a strap element located in the upper portion of the curved support surface and forming with the curved deflection surface an inlet conduit.

7 Claims, 8 Drawing Sheets

GUIDE DEVICE FOR A DISTRIBUTIVE CONVEYOR ARRANGEMENT

CROSS-REFERENCE TO RELATED APPLICATIONS

This application claims the priority of application Serial No. P 44 16 893, filed in Germany on May 13, 1994, which is incorporated herein by reference.

FIELD OF THE INVENTION

The present invention relates to a guide device for a distributive conveyor arrangement for rectangular flat pieces of mail, such as letter mail. The conveyor arrangement includes a conveying conduit in which the mail is conveyed in an essentially horizontal direction and in which the lower edge of the mail is guided along a supporting surface. A plurality of shunts are sequentially arranged along the conveying conduit, and are selectively activated.

The guide device is connected to the conveying conduit. The mail is shunted to the guide device by activating a respective shunt. Once shunted to the guide device, the direction of movement and the position of the mail is changed in the guide device so that the individual pieces of mail reach a stack container to form a stack of mail pieces resting flat on top of each other. The stack is essentially vertical relative to the original conveying direction (i.e., the direction of the mail along the conveying conduit).

BACKGROUND OF THE INVENTION

Guide devices are known, for example, from German Patent 25 23 835, in which the guide device is inserted between the outlets of the shunts and the corresponding stack containers. This known guide device consists of a slide having a curved deflection surface and a curved support surface intersecting each other essentially at right angles. A portion of the curved deflection surface adjoins the shunt, and is inclined in a plane defined by the pieces of mail exiting the shunt. The deflection curved surface further has a lower edge forming an acute angle relative to the horizontal, the vertex of which faces a prior guide device in the direction of conveyance.

The curved support surface has an upper portion adjoining a supporting surface of the conveying arrangement, and has a profile corresponding to a drop curve of a piece of mail occurring on the curved deflection surface, so that during the deflection of the piece of mail, a lower edge of the piece of mail remains in contact with the curved support surface.

With the known guide device, there is a danger that the pieces of mail will not be slowed down sufficiently in the guide device and thus the mail will be pushed beyond an outer edge of the curved deflection surface. Further, there is a possibility that the pieces of mail will overturn during the deflection and slow-down process, especially at high transport speeds of the conveyor arrangement and with large pieces of mail. Additionally, there is a possibility that the mail will be folded over an upper support edge of the guide device, particularly with light pieces of mail of large size which stand on their short edge.

SUMMARY OF THE INVENTION

It is an object of the present invention to provide a guide device so that large pieces of mail can be processed at high speeds.

The above and other objects are accomplished according to the invention by the provision of a guide device for moving flat pieces of mail from a conveyor arrangement and stacking the mail in a direction extending perpendicular to a conveying direction of the mail. The conveyor arrangement has a shunt for diverting mail to the guide device. The guide device includes a curved support surface and an outer lateral wall defining a curved deflection surface. The outer lateral wall has an upper portion, a lower portion having an outlet area, and an essentially spherically shaped transition area for moving the pieces of mail from an essentially vertical into an essentially horizontal position. The upper portion of the outer lateral wall has a height essentially equal to a height of the shunt. The upper portion of the wall adjoins the conveyor arrangement, and extends at an acute angel relative to the conveying direction. Further, the upper portion of the wall is essentially level along a length. The length is essentially equal to a distance between an inner end point of the outlet area and a vertical line passing through a beginning point of the outer lateral wall. An area of the outer lateral wall corresponding to the outlet area forms an essentially perpendicular angle relative to the conveying direction. The curved support surface and the outlet area form an outlet conduit having a narrowest width essentially equal to a maximum height of the pieces of mail to be moved. The guide device includes a strap element located in the upper portion of the curved support surface and forming with the curved deflection surface an inlet conduit.

The present invention takes into account that increased speed and larger sizes of mail results in a changed drop curve of the pieces of mail. In contrast to the prior art device, the present invention improves the shape of the deflection and support surface, in particular by raising an outer lateral wall of the deflection surface, and by providing a strap element which forms an inlet conduit together with the deflection surface.

The invention will be described below in greater detail in connection with an embodiment thereof that is illustrated in the drawing figures.

DETAILED DESCRIPTION OF THE INVENTION

Figure 1:
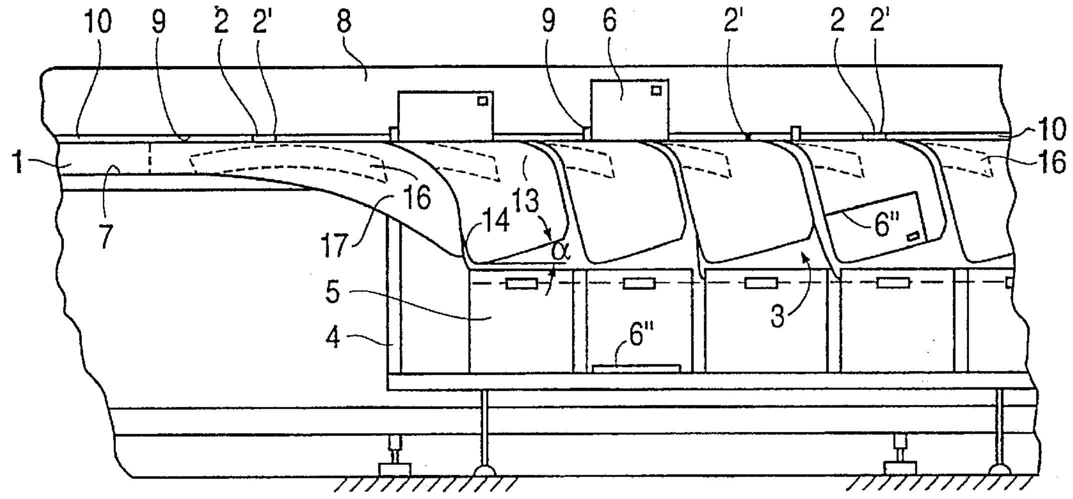
FIG. 1 is a front view of a distributive conveyor arrangement having several guide devices in accordance with the invention.
Figure 2:
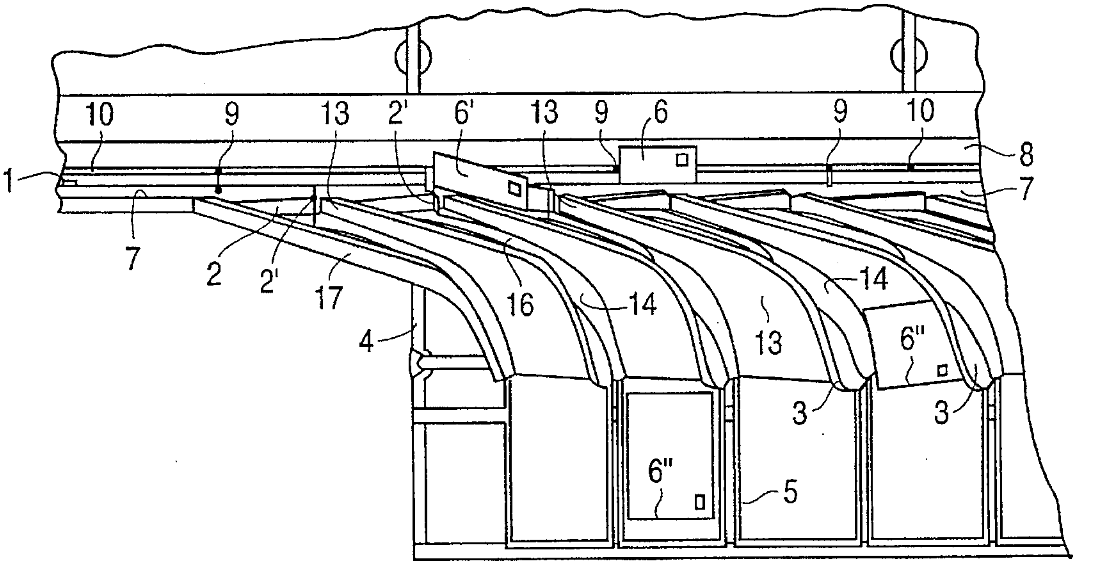
FIG. 2 is a top view of a distributive conveyor arrangement having several guide devices in accordance with the invention.

Referring to FIGS. 1 and 2, a distributive conveyor arrangement is illustrated. A conveying conduit 1, a plurality of shunts 2, and a plurality of guide devices 3 are arranged on a machine frame 4. Stack containers 5 are provided for receiving the pieces of mail 6. Alternatively, instead of stack containers 5, interchangeable carts could be provided (not shown).

Shunts 2 are typically shunt flaps which are pivotal into conveying conduit 1 about a pivot axis 2'. The height of the shunt flaps is less than the height of the lowest piece of mail to be distributed. The actuating means of the shunt flaps are known and therefore are not illustrated for the sake of clarity. In FIG. 2, the third shunt from the left is in a deflection position, and the remaining shunts are shown in a position of rest.

The conveying conduit 1 has a support surface 7 for guiding a lower edge of the pieces of mail 6, and a lateral wall 8. The support surface 7 of the conveying conduit is inclined at an angle of approximately 20° transverse to the conveyor arrangement and with respect to the horizontal, so that the pieces of mail 6 rest obliquely against lateral wall 8.

Figure 3:
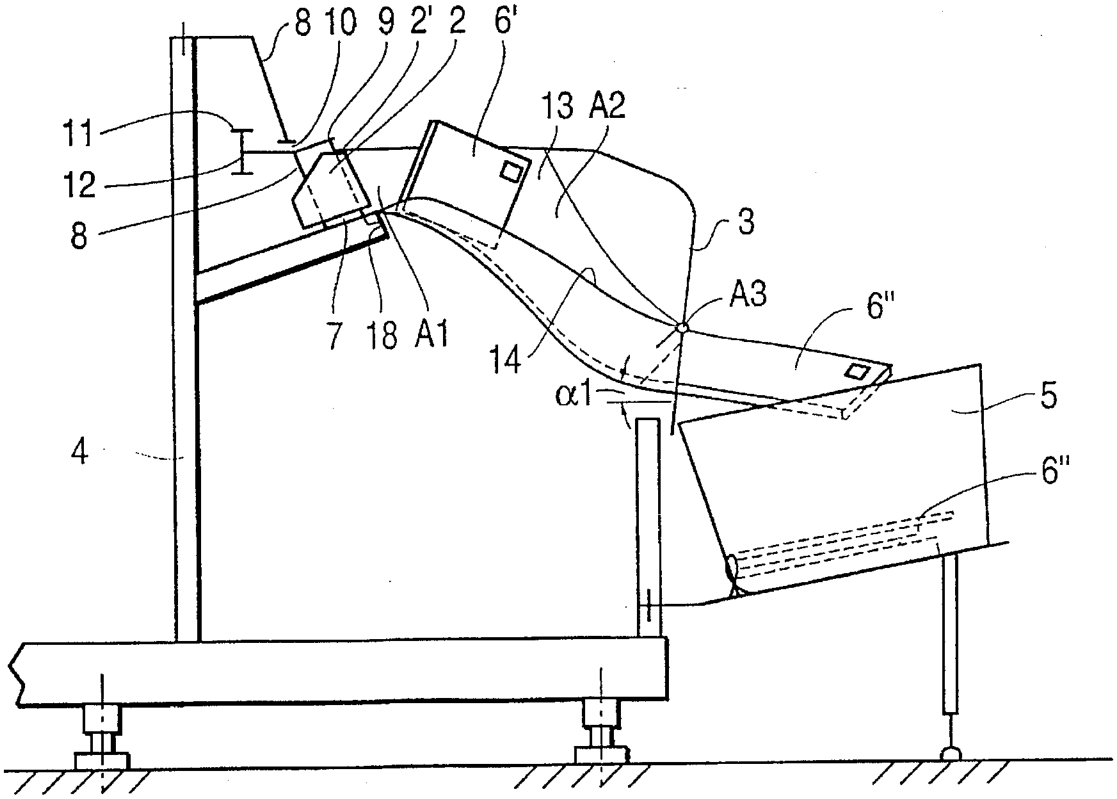
FIG. 3 is a lateral view of a distributive conveyor arrangement and a guide device according to the present invention.

Sliding fingers 9 project through a slit 10 in lateral wall 8, and are used to convey the mail pieces along the conveyor arrangement. As illustrated in FIG. 3, guide rails 11 support an endless drive belt 12. Each sliding finger is attached in a known manner to the endless drive belt 12.

Sliding fingers 9 are bent upward by approximately 20°, so that the end of each sliding finger 9 is essentially parallel with support surface 7. This improves the sliding of a rear edge of the piece of mail away from sliding finger 9, in particular with large thin pieces of mail, during the transfer of the pieces of mail to guide device 3.

Figure 5:
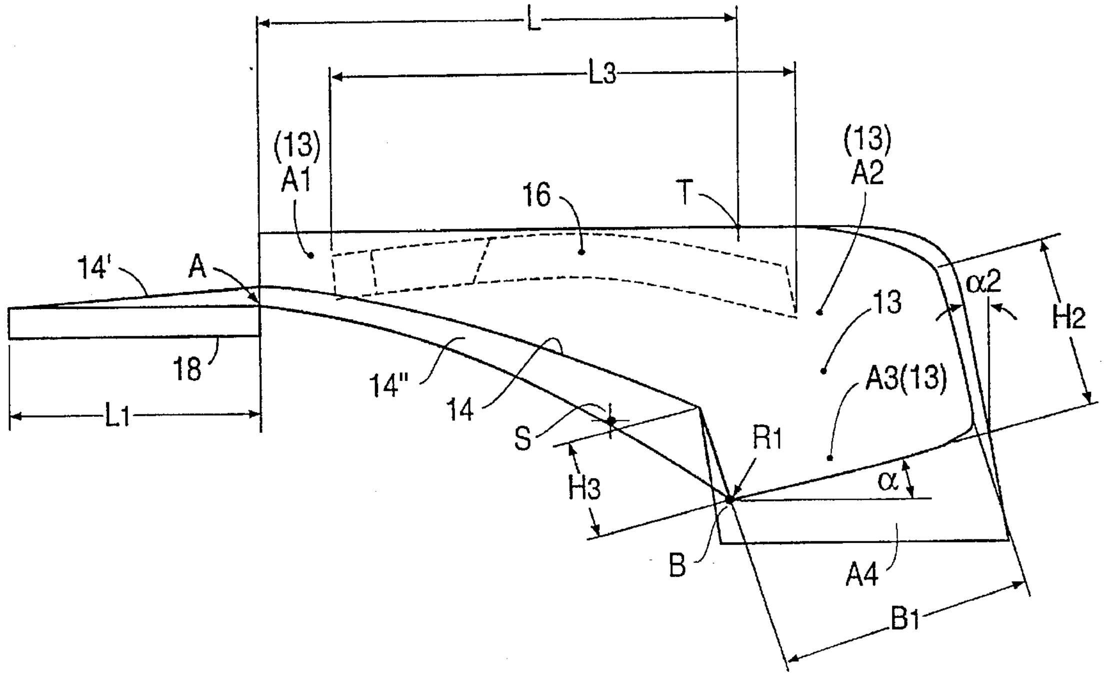
FIG. 5 is a front view of a guide device in an installed position according to the present invention.
Figure 6:
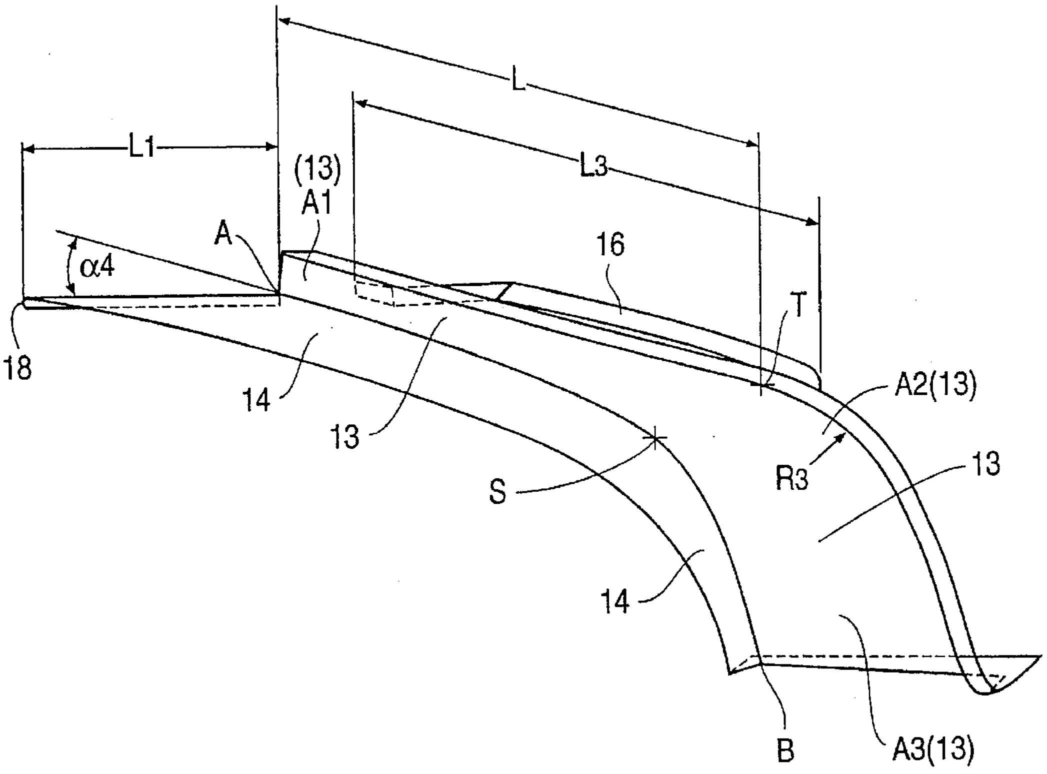
FIG. 6 is a top view of an installed guide device in accordance with the invention.
Figure 7:
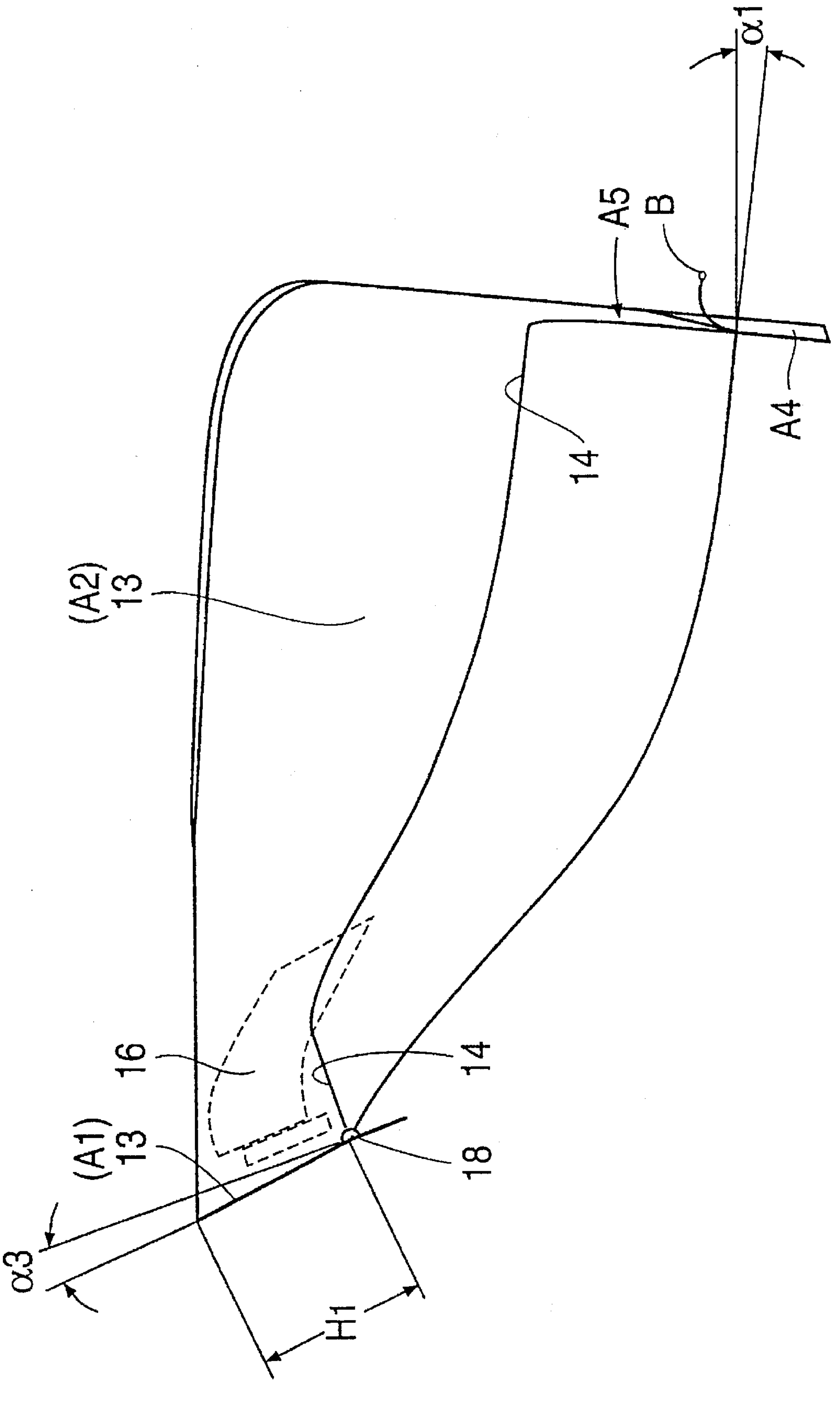
FIG. 7 is a lateral view of an installed guide device in accordance with the invention.

Each guide device 3 has a curved deflection surface 13, and a curved support surface 14, each intersecting and extending at an angle with respect to the other. Referring also to FIGS. 5 through 7, in the area of their intersection, deflection surface 13 and curved support surface 14 first form an angle slightly wider than 90° at the starting point A, which then continuously decreases to the area designated by S to approximately 68°. The angle then widens to form an angle slightly wider than 90° at the end point B. The intersection line between the two surfaces 13 and 14 has a radius R1 over its entire length from A to B. This configuration optimally allows the lower edges of the moved-out pieces of mail to slide off the guide device. Thus, as the pieces of mail 6" move off of guide device 3 into stack container 5, the long edge of the mail is supported at end point B (see also FIGS. 1 to 3).

Deflection surface 13 has an upper area A1 adjoining shunt 2 and arranged in a plane corresponding to an inclination of a plane defined by the pieces of mail exiting via a shunt 2 which is in the deflection position (FIGS. 2 and 3). Successive pivot axes 2' are separated from one another by a distance, so that the upper areas of each successive deflection surface 13 overlap each other similar to roof tiles (FIGS. 1 and 2).

Each deflection surface 13 further has an essentially spherically shaped transition area A2, and a lower portion comprising an outlet area A3 and a lower edge A4 facing the deposited pieces of mail. Outlet area A3 of the lower portion forms an acute angle $\alpha$ of approximately 15° with the horizontal, the vertex of which is essentially oriented opposite to the original conveying, direction of the pieces of mail. Further, outlet area A3 forms an angle $\alpha_1$ of approximately 6° with the horizontal, the vertex of which is oriented transversely to the original conveying direction.

Spherically shaped transition area A2 is located between outlet area A3 and upper area A1 for guiding the pieces of mail from an essentially vertical into an essentially horizontal position.

As best illustrated in FIGS. 5 and 7, outlet area A3 and curved support surface 14 together form an outlet conduit A5 having a minimum width B1 at its end. Width B1 is equal to the maximum height of the pieces of mail to be moved out.

Curved support surface 14 has an upper portion 14' adjoining support surface 7 of conveying conduit 1, and a curved portion 14" having a profile corresponding to the drop curve of the pieces of mail along deflection surface 13. The drop curve is a function of the angle of inclination of deflection surface 13, and friction forces occurring between the mail and the deflection surface. The profile is such that the lower edges of the pieces of mail remain in contact with support surface 14.

Figure 4:
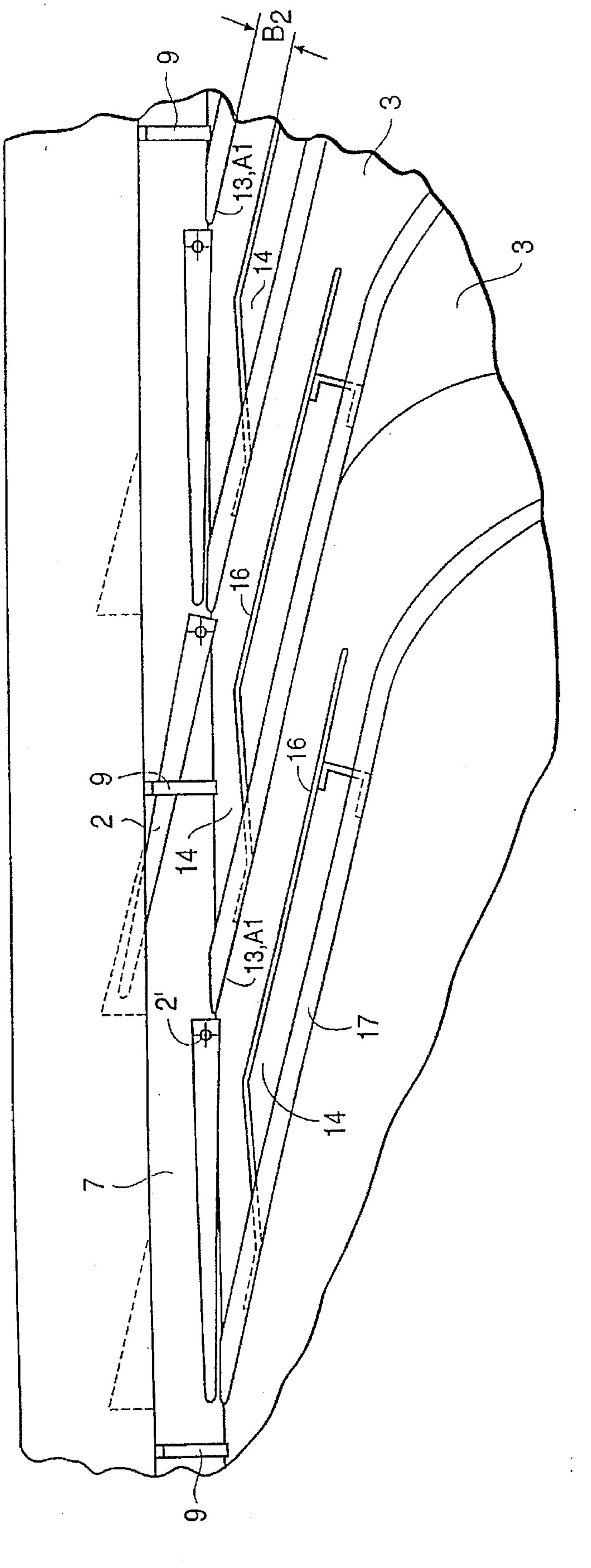
FIG. 4 is a top view (inclined by 20°) of the inlet areas of several guide devices in accordance with the invention.

Referring also to FIG. 4, typically a strap element 16 is provided attached to an outside of the upper area of each successive deflection surface 13. Because adjacent deflection surfaces 13 overlap each other similar to roof tiles, strap element 16, together with upper area A1 of an adjacent deflection surface 13, forms an inlet conduit for the adjacent guide device having a width B2 essentially equal to twice the width of the thickest piece of mail to be moved out. Strap element 16 prevents the deflected piece of mail 6 from laterally sliding off of the guide surface, and guides a lower area of the deflected piece of mail 6' to the deflection surface 13.

Strap element 16 has a length L3 (FIG. 5), and is shaped to form an inclined inlet and a subsequent guide surface each being essentially parallel to upper area A1 of the adjacent guide device. The lower edge of strap element 16 is rounded so that the strap element extends above support surface 14 of the succeeding guide device with a narrow air gap at the beginning and a considerably wider air gap at the end of length L3. Thus, lateral jamming of the lower edge of the moved out piece of mail is prevented as the mail is guided into guide device 3, and optimal entry of the mail into transition area A2 is ensured.

As is apparent from FIGS. 1, 2 and 4, with respect to the first guide device of the distributive conveyor arrangement, there is not a deflection surface 13 available to attach strap element 16 to. As such, a panel 17 is provided for the attachment thereto of the first strap element in the sequence.

FIGS. 5 to 7 each show a detailed representation of the front, top and lateral views, respectively, of guide device 3 in an installed position. As shown, guide device 3 has an attachment surface 18 for fastening the guide device to the distributive conveyor arrangement. Attachment surface 18 is located at the upper, beginning portion 14' of curved support surface 14, along a length L1. In the installed position as shown, attachment surface 18 is inclined by about 20° (FIG. 3). The upper portion of support surface 14 is essentially perpendicular to attachment surface 18.

At the beginning of upper area A1, deflection surface 13 has a height H1 (FIG. 7) inclined at an angle $\alpha_3$ (approximately 5°) relative to the conveying direction and backward away from curved support surface 14 so as to be adapted to the position of the piece of mail deflected by shunt 2. Height H1 is essentially equal to a height of shunt 2.

The upper area A1 extends in the form of an outer lateral wall that is essentially level over a length L in a direction forming an acute angle $\alpha_4$ (approximately 15°) with the original conveying direction.

As shown best in FIG. 5, in outlet area A3 the outer lateral wall is slightly inclined at an angle $\alpha_2$, i.e., essentially perpendicular, in relation to the original transport direction (approximately 14°).

An end point T of the length L is located at an upper edge of deflection surface 13, and is simultaneously the starting point for a transition radius R3, likewise located at the upper edge of deflection surface 13 (see FIGS. 5 and 6).

Length L is essentially equal to the distance between the inner end point B of outlet area A3 and a vertical line located on upper area A1 passing through starting point A of the outer lateral wall.

Length L is selected so that the corner point at the front upper edge of the tallest piece of mail to be moved out lies essentially at the upper edge of deflection surface 13 at end point T. In the process, the corner point at the lower front edge lies on the section line A–B defined by the joining of the two surfaces 13 and 14, and is essentially at the point S (see FIG. 5 and 6). This means that the length of a connecting line between the points T and S essentially corresponds to the maximum format height of a piece of mail to be moved out. The optimal entry of the pieces of mail into the transition area A2 is achieved by this configuration.

Figure 8:
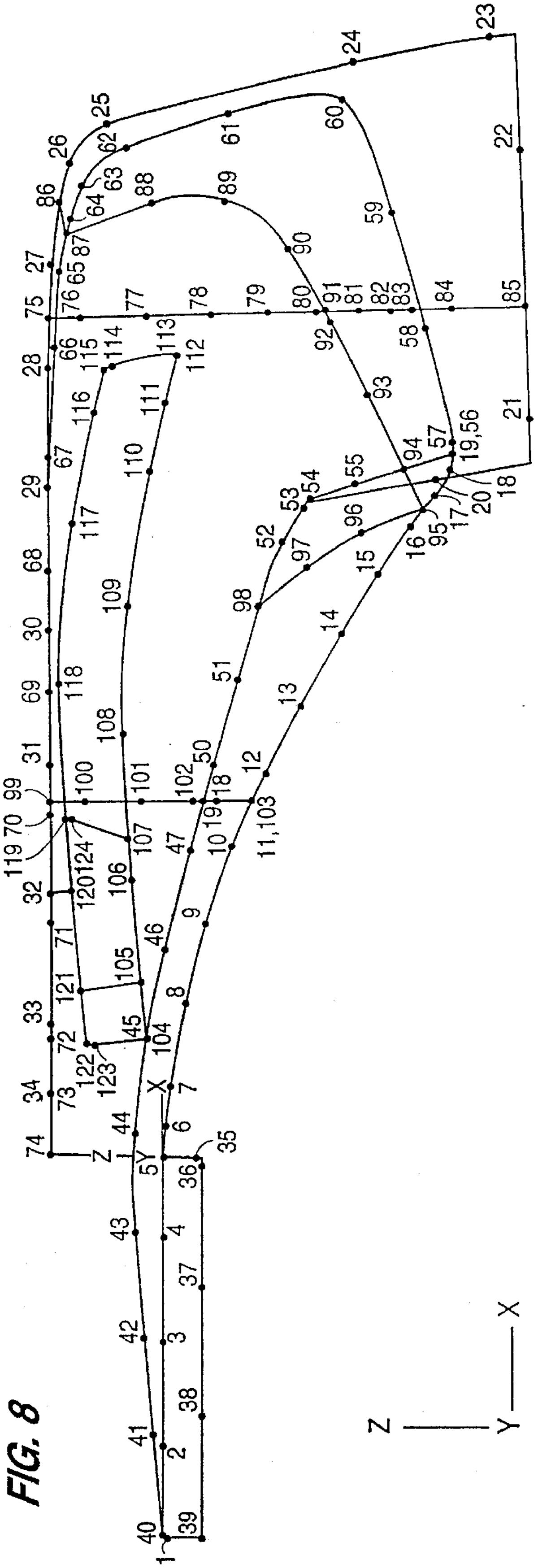
FIG. 8 is a front view of the guide device corresponding to FIG. 5, graphically illustrated with 124 measuring points and three intersection lines.
Figure 9:
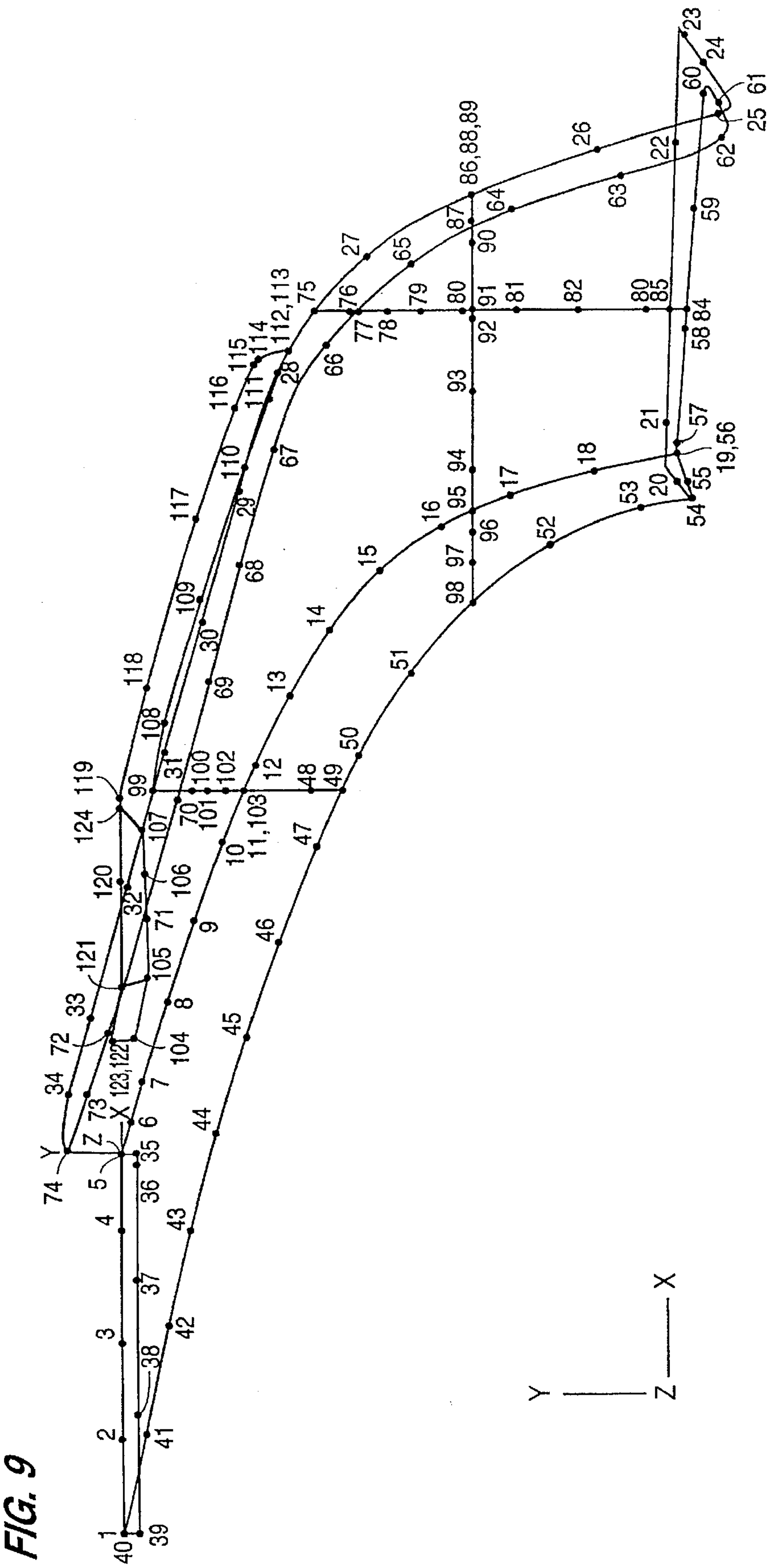
FIG. 9 is a top view of the guide device corresponding to FIG. 6, graphically illustrated with 124 measuring points and three intersection lines.
Figure 10:
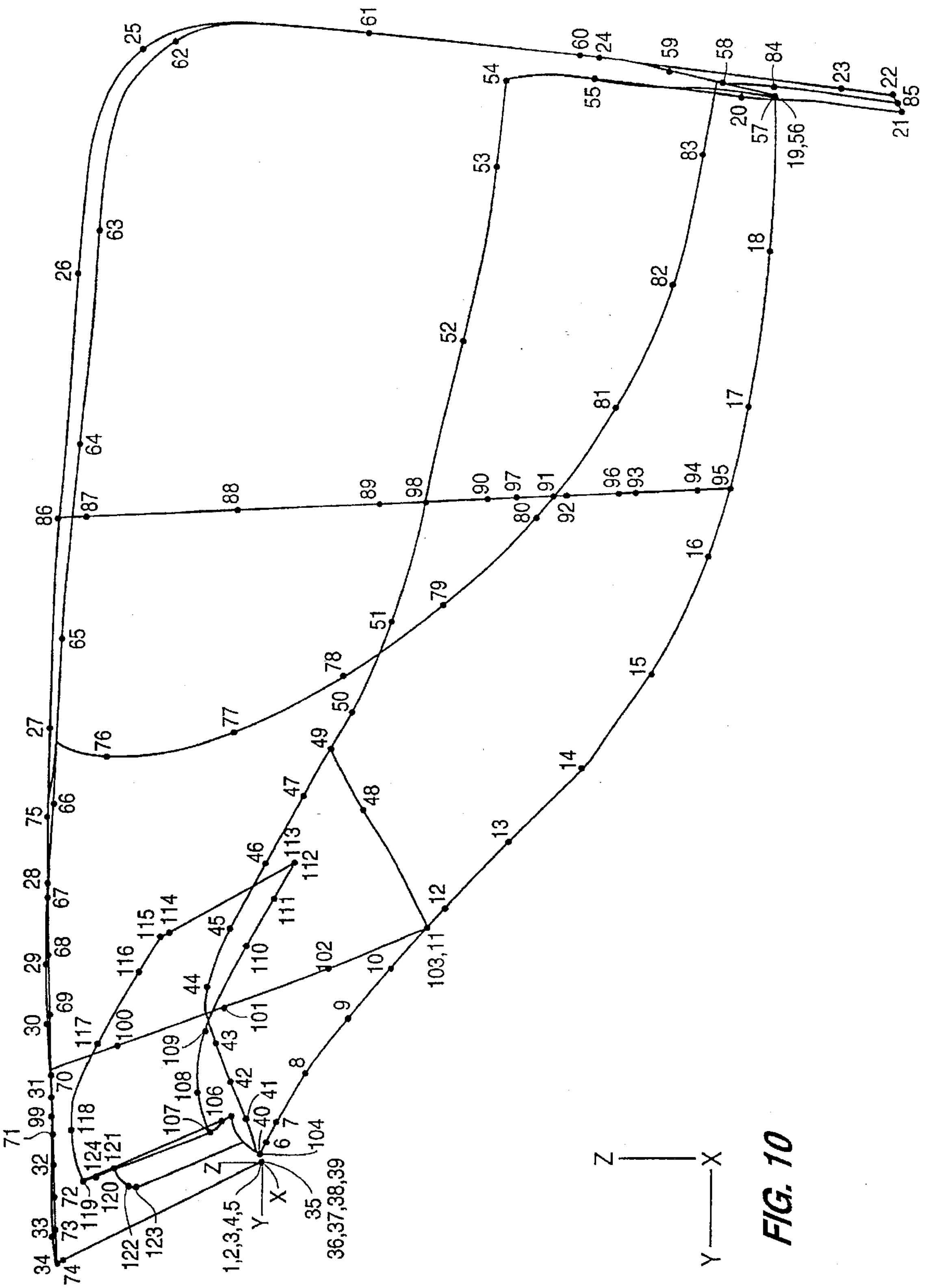
FIG. 10 is a lateral view of the guide device corresponding to FIG. 7, graphically illustrated with 124 measuring points and three intersection lines.

FIGS. 8, 9 and 10 show a preferred embodiment of the guide device in the installed position in three views, surveyed as a plane model and shown with 124 measuring points and three intersection lines.

Table 1 contains the measured values for the coordinates X, Y and Z for the 124 measuring points. The guide device was surveyed in the installed position.

TABLE 1

| No. | X (mm) | Y (mm) | Z (mm) |
|---|---|---|---|
| 0001 | X − 0315.06 | Y − 0000.00 | Z − 0000.00 |
| 0002 | X − 0236.45 | Y − 0000.00 | Z − 0000.00 |
| 0003 | X − 0151.62 | Y − 0000.00 | Z − 0000.00 |
| 0004 | X − 0066.79 | Y − 0000.00 | Z − 0000.00 |
| 0005 | X + 0000.00 | Y + 0000.00 | Z + 0000.00 |
| 0006 | X + 0024.25 | Y − 0008.61 | Z − 0002.11 |
| 0007 | X + 0055.29 | Y − 0017.51 | Z − 0007.60 |
| 0008 | X + 0125.43 | Y − 0038.93 | Z − 0023.84 |
| 0009 | X + 0192.00 | Y − 0061.13 | Z − 0043.61 |
| 0010 | X + 0256.82 | Y − 0085.04 | Z − 0067.42 |
| 0011 | X + 0298.90 | Y − 0102.41 | Z − 0085.78 |
| 0012 | X + 0318.74 | Y − 0111.17 | Z − 0095.22 |
| 0013 | X + 0377.78 | Y − 0139.98 | Z − 0126.83 |
| 0014 | X + 0432.99 | Y − 0171.65 | Z − 0162.36 |
| 0015 | X + 0481.54 | Y − 0214.72 | Z − 0195.08 |
| 0016 | X + 0521.15 | Y − 0268.72 | Z − 0223.13 |
| 0017 | X + 0545.83 | Y − 0334.36 | Z − 0242.76 |
| 0018 | X + 0563.86 | Y − 0403.91 | Z − 0255.06 |
| 0019 | X + 0579.77 | Y − 0474.86 | Z − 0260.21 |
| 0020 | X + 0556.50 | Y − 0475.06 | Z − 0244.09 |
| 0021 | X + 0607.09 | Y − 0467.61 | Z − 0318.66 |
| 0022 | X + 0833.14 | Y − 0472.12 | Z − 0315.83 |
| 0023 | X + 0920.32 | Y − 0477.85 | Z − 0290.35 |
| 0024 | X + 0899.93 | Y − 0494.29 | Z − 0180.37 |
| 0025 | X + 0856.67 | Y − 0506.24 | Z + 0038.22 |
| 0026 | X + 0826.34 | Y − 0405.97 | Z + 0071.16 |
| 0027 | X + 0741.07 | Y − 0199.10 | Z + 0091.20 |
| 0028 | X + 0653.67 | Y − 0129.00 | Z + 0094.64 |
| 0029 | X + 0546.63 | Y − 0093.20 | Z + 0095.73 |
| 0030 | X + 0437.85 | Y − 0062.41 | Z + 0095.85 |
| 0031 | X + 0328.92 | Y − 0032.14 | Z + 0096.26 |
| 0032 | X + 0219.97 | Y − 0001.93 | Z + 0096.90 |
| 0033 | X + 0110.95 | Y + 0027.98 | Z + 0097.48 |
| 0034 | X + 0050.16 | Y + 0043.03 | Z + 0097.90 |
| 0035 | X − 0003.51 | Y − 0012.32 | Z − 0034.17 |
| 0036 | X − 0006.50 | Y − 0013.15 | Z − 0036.49 |
| 0037 | X − 0108.94 | Y − 0013.17 | Z − 0036.50 |
| 0038 | X − 0211.38 | Y − 0013.18 | Z − 0036.51 |
| 0039 | X − 0313.83 | Y − 0013.20 | Z − 0036.53 |
| 0040 | X − 0315.04 | Y − 0001.56 | Z + 0000.70 |
| 0041 | X − 0231.90 | Y − 0020.18 | Z + 0007.02 |
| 0042 | X − 0148.48 | Y − 0037.41 | Z + 0013.48 |
| 0043 | X − 0065.19 | Y − 0055.25 | Z + 0020.08 |
| 0044 | X + 0016.81 | Y − 0078.35 | Z + 0022.57 |
| 0045 | X + 0096.82 | Y − 0106.10 | Z + 0011.53 |
| 0046 | X + 0175.51 | Y − 0134.77 | Z − 0005.23 |
| 0047 | X + 0252.44 | Y − 0165.36 | Z − 0026.28 |
| 0048 | X + 0298.87 | Y − 0157.99 | Z − 0055.40 |
| 0049 | X + 0298.86 | Y − 0186.10 | Z − 0040.75 |
| 0050 | X + 0326.86 | Y − 0199.99 | Z − 0049.89 |
| 0051 | X + 0396.69 | Y − 0243.35 | Z − 0072.81 |
| 0052 | X + 0504.42 | Y − 0368.42 | Z − 0111.34 |
| 0053 | X + 0533.66 | Y − 0446.00 | Z − 0130.78 |
| 0054 | X + 0541.98 | Y − 0485.58 | Z − 0136.84 |
| 0055 | X + 0555.66 | Y − 0484.15 | Z − 0178.82 |
| 0056 | X + 0579.77 | Y − 0474.86 | Z − 0260.21 |
| 0057 | X + 0587.12 | Y − 0475.54 | Z − 0258.89 |
| 0058 | X + 0684.70 | Y − 0481.37 | Z − 0236.93 |
| 0059 | X + 0781.76 | Y − 0487.17 | Z − 0212.74 |
| 0060 | X + 0874.61 | Y − 0495.25 | Z − 0171.76 |
| 0061 | X + 0864.62 | Y − 0507.91 | Z − 0070.80 |
| 0062 | X + 0838.15 | Y − 0508.60 | Z + 0024.58 |
| 0063 | X + 0806.70 | Y − 0426.35 | Z + 0062.14 |
| 0064 | X + 0778.83 | Y − 0330.75 | Z + 0073.30 |
| 0065 | X + 0735.87 | Y − 0241.39 | Z + 0084.08 |
| 0066 | X + 0670.77 | Y − 0165.75 | Z + 0090.51 |
| 0067 | X + 0581.21 | Y − 0123.07 | Z + 0093.53 |
| 0068 | X + 0484.49 | Y − 0096.89 | Z + 0094.13 |
| 0069 | X + 0387.91 | Y − 0070.18 | Z + 0094.61 |
| 0070 | X + 0291.26 | Y − 0043.68 | Z + 0094.85 |
| 0071 | X + 0194.87 | Y − 0016.31 | Z + 0095.26 |
| 0072 | X + 0098.92 | Y + 0012.59 | Z + 0096.24 |
| 0073 | X + 0050.46 | Y + 0027.58 | Z + 0096.43 |
| 0074 | X + 0003.26 | Y + 0042.42 | Z + 0096.66 |
| 0075 | X + 0698.30 | Y − 0156.73 | Z − 0093.04 |
| 0076 | X + 0698.45 | Y − 0187.01 | Z + 0066.74 |
| 0077 | X + 0698.69 | Y − 0195.36 | Z + 0007.57 |
| 0078 | X + 0698.95 | Y − 0219.40 | Z − 0047.63 |
| 0079 | X + 0699.20 | Y − 0250.16 | Z − 0099.40 |
| 0080 | X + 0699.44 | Y − 0289.35 | Z − 0145.09 |
| 0081 | X + 0699.66 | Y − 0336.22 | Z − 0182.87 |
| 0082 | X + 0699.86 | Y − 0389.85 | Z − 0210.11 |
| 0083 | X + 0700.01 | Y − 0447.92 | Z − 0226.06 |
| 0084 | X + 0700.19 | Y − 0479.07 | Z − 0258.05 |
| 0085 | X + 0700.40 | Y − 0470.31 | Z − 0317.68 |
| 0086 | X + 0792.92 | Y − 0298.05 | Z + 0082.54 |
| 0087 | X + 0770.05 | Y − 0298.09 | Z + 0068.84 |
| 0088 | X + 0792.08 | Y − 0298.05 | Z + 0002.25 |
| 0089 | X + 0794.38 | Y − 0298.05 | Z − 0066.96 |
| 0090 | X + 0751.78 | Y − 0298.12 | Z − 0120.59 |
| 0091 | X + 0699.48 | Y − 0298.21 | Z − 0153.42 |
| 0092 | X + 0692.14 | Y − 0298.22 | Z − 0157.44 |
| 0093 | X + 0629.04 | Y − 0298.32 | Z − 0188.05 |
| 0094 | X + 0565.33 | Y − 0298.43 | Z − 0217.42 |
| 0095 | X + 0533.57 | Y − 0298.48 | Z − 0232.30 |
| 0096 | X + 0513.66 | Y − 0298.51 | Z − 0182.13 |
| 0097 | X + 0487.59 | Y − 0298.56 | Z − 0134.87 |
| 0098 | X + 0456.08 | Y − 0298.61 | Z − 0091.06 |
| 0099 | X + 0298.06 | Y − 0023.58 | Z + 0096.43 |
| 0100 | X + 0298.23 | Y − 0054.80 | Z + 0065.45 |
| 0101 | X + 0298.45 | Y − 0069.92 | Z + 0014.80 |
| 0102 | X + 0298.68 | Y − 0085.48 | Z − 0035.71 |
| 0103 | X + 0298.90 | Y − 0102.42 | Z − 0085.77 |
| 0104 | X + 0097.82 | Y − 0009.83 | Z + 0009.44 |
| 0106 | X + 0230.61 | Y − 0016.55 | Z + 0021.00 |
| 0107 | X + 0265.35 | Y − 0014.53 | Z + 0024.86 |
| 0108 | X + 0353.48 | Y − 0032.81 | Z + 0029.89 |
| 0109 | X + 0457.20 | Y − 0060.30 | Z + 0024.59 |
| 0110 | X + 0566.80 | Y − 0097.11 | Z + 0003.79 |
| 0111 | X + 0623.06 | Y − 0118.54 | Z − 0010.25 |
| 0112 | X + 0663.99 | Y − 0135.00 | Z − 0021.30 |
| 0113 | X + 0665.25 | Y − 0134.98 | Z − 0020.45 |
| 0114 | X + 0654.68 | Y − 0105.49 | Z + 0041.67 |
| 0115 | X + 0652.27 | Y − 0103.32 | Z + 0044.99 |
| 0116 | X + 0615.57 | Y − 0088.46 | Z + 0054.52 |
| 0117 | X + 0525.78 | Y − 0056.03 | Z + 0074.64 |
| 0118 | X + 0393.24 | Y − 0018.17 | Z + 0087.99 |
| 0119 | X + 0286.44 | Y + 0005.20 | Z + 0082.86 |
| 0120 | X + 0223.58 | Y + 0003.04 | Z + 0077.82 |
| 0121 | X + 0138.78 | Y − 0000.15 | Z + 0070.40 |

TABLE 1-continued

| No. | X (mm) | Y (mm) | Z (mm) |
|---|---|---|---|
| 0122 | X + 0094.61 | Y + 0009.37 | Z + 0063.54 |
| 0123 | X + 0092.71 | Y + 0009.07 | Z + 0061.15 |
| 0124 | X + 0284.57 | Y + 0003.59 | Z + 0078.06 |

In this table, measuring point 5 is the zero point in the Cartesian coordinate system. It corresponds to point A in FIGS. 5 and 6. Measuring point 19 is identical with the measuring point 56 and therefore corresponds to point B. The intersection line A–B between deflection surface 13 and support surface 14 is described by points 5 to 19.

The shape and length of strap element 16 is described by measuring points 104 to 124. Support surface 14 is described by measuring points 1 to 19 and 40 to 56. Deflection surface is described by measuring points 5 to 19 and 56 to 74.

Attachment surface 18 is described by measuring points 1 to 5 and 35 to 39. The additional three intersection lines are described by the measuring points 75 to 85, 86 to 98 and to 103, 48 and 49.

The point T lies in the vicinity of measuring point 67 (in the direction of measuring point 66).

The point S lies in the vicinity of measuring point 14.

In order to dependably and rapidly move out pieces of mail in plastic envelopes, it is advantageous to make the guide device with a structured surface. This prevents the adhesion of plastic envelopes.

Pieces of mail with the following preferable dimensions can be moved out using the described guide device:

Thickness: 0.2 to 20 mm.

Length: 152 to 381 mm.

Height: 152 to 305 mm.

Weight: maximum of 500 g.

The invention now being fully described, it will be apparent to one of ordinary skill in the art that any changes and modifications can be made thereto without departing from the spirit or scope of the invention as set forth herein.

What is claimed is:

1. A guide device for moving flat pieces of mail from a conveyor arrangement, and stacking the mail in a direction extending perpendicular to a conveying direction of the mail along a conveyor support surface of the conveyor arrangement, the conveyor arrangement having a shunt for diverting mail to the guide device, the guide device comprising:

(A) an outer lateral wall defining a curved deflection surface (13), said outer later wall including:

(1) an upper portion (A1) adjoining the conveyor arrangement, being arranged in a plane corresponding to the plane of the pieces of mail to be moved from the conveyor arrangement, having a height essentially equal to a height of the shunt, extending at an acute angle relative to the conveying direction, and being essentially level along a length (L);

(2) an essentially spherically shaped transition area (A2) adjacent to said upper portion for moving the pieces of mail from an essentially vertical position into an essentially horizontal position; and (3) a lower portion adjacent to said transition area forming an essentially perpendicular angle relative to the conveying direction, and having an outlet area (A3) with a lower edge forming an acute angle relative to a horizontal line, the acute angle having a vertex pointing essentially opposite to the conveying direction, the length of said upper portion being about equal to a distance between an inner end point (B) of the outlet area and a vertical line passing through a beginning point (A) of the outer lateral wall;

(B) a curved support surface (14) having:

(1) an upper portion (14') adjoining the conveyor support surface; and (2) a curved portion (14") having a profile corresponding to a drop curve defined by a path of the pieces of mail along said deflection surface so that a lower edge of each piece of mail remains in contact with the curved support surface during a deflection of the mail, said deflection surface and said curved support surface intersecting each other at essentially a right angle, said curved support surface and said outlet area forming an outlet conduit having a narrowest width essentially equal to a maximum height of the pieces of mail to be moved; and (C) a strap element (16) located in the upper portion of the curved support surface and forming together with the curved deflection surface an inlet conduit.

2. A guide device as defined in claim 1, wherein said strap element has a lower edge located above said curved support surface to define a first air gap at a beginning and a second air gap at an end of said strap element, the first air gap being narrower than the second air gap.

3. A guide device as defined in claim 1, wherein said guide device comprises a material having one of a smooth and structured surface, the structured surface being a structure similar to an orange peel.

4. A distributive conveyor arrangement for distributing rectangular flat pieces of mail, said arrangement comprising a conveying conduit having a conveyor support surface and a sliding element for guiding a lower edge of the mail pieces along the conveyor support surface in an essentially horizontal direction, the arrangement further having a number of selectively actuatable shunts placed in succession along the conveying conduit and one guide device adjoining each respective shunt, each guide device comprising the guide device as defined in claim 1.

5. A distributive conveyor arrangement as defined in claim 4, wherein said strap element is fastened on an exterior of the upper portion of a respective deflection surface, said fastened strap element and an adjacent deflection surface together forming an inlet conduit.

6. A guide device as defined in claim 4, wherein the sliding element comprises a sliding finger having an end extending into the conveying conduit and being movable parallel with the surface for transporting the pieces of mail to a respective shunt.

7. A guide device for moving flat pieces of mail from a conveyor arrangement, and stacking the mail in a direction extending perpendicular to a conveying direction of the mail along a conveyor support surface of the conveyor arrangement, the conveyor arrangement having a shunt for diverting mail to the guide device, the guide device comprising:

(A) a curved deflection surface (13), including:

(1) an upper portion adjoining the conveyor arrangement, said upper portion being arranged in a plane corresponding to the pieces of mail to be moved; and (2) a lower portion forming an acute angle relative to a horizontal line, the acute angle having a vertex pointing essentially opposite to the conveying direction;

(B) a curved support surface (14) having:

(1) an upper portion (14') adjoining the conveyor support surface; and (2) a curved portion (14") having a profile corresponding to a drop curve defined by a path of the pieces of mail along said deflection surface so that a lower edge of each piece of mail remains in contact with the curved support surface during a deflection of the mail, said deflection surface and said curved support surface intersecting each other at essentially a right angle; and (C) a strap element (16) located in the upper portion of the curved support surface and forming together with the curved deflection surface an inlet conduit, the mail direction being changed by said guide device so that the mail is deposited in a stack extending essentially perpendicular to the conveying direction;

wherein said guide device includes X, Y, and Z measuring coordinate points 1 through 124, set forth in the following measured value table:

| No. | X (mm) | Y (mm) | Z (mm) |
|---|---|---|---|
| 0001 | X − 0315.06 | Y − 0000.00 | Z − 0000.00 |
| 0002 | X − 0236.45 | Y − 0000.00 | Z − 0000.00 |
| 0003 | X − 0151.62 | Y − 0000.00 | Z − 0000.00 |
| 0004 | X − 0066.79 | Y − 0000.00 | Z − 0000.00 |
| 0005 | X + 0000.00 | Y + 0000.00 | Z + 0000.00 |
| 0006 | X + 0024.25 | Y − 0008.61 | Z − 0002.11 |
| 0007 | X + 0055.29 | Y − 0017.51 | Z − 0007.60 |
| 0008 | X + 0125.43 | Y − 0038.93 | Z − 0023.84 |
| 0009 | X + 0192.00 | Y − 0061.13 | Z − 0043.61 |
| 0010 | X + 0256.82 | Y − 0085.04 | Z − 0067.42 |
| 0011 | X + 0298.90 | Y − 0102.41 | Z − 0085.78 |
| 0012 | X + 0318.74 | Y − 0111.17 | Z − 0095.22 |
| 0013 | X + 0377.78 | Y − 0139.98 | Z − 0126.83 |
| 0014 | X + 0432.99 | Y − 0171.65 | Z − 0162.36 |
| 0015 | X + 0481.54 | Y − 0214.72 | Z − 0195.08 |
| 0016 | X + 0521.15 | Y − 0268.72 | Z − 0223.13 |
| 0017 | X + 0545.83 | Y − 0334.36 | Z − 0242.76 |
| 0018 | X + 0563.86 | Y − 0403.91 | Z − 0255.06 |
| 0019 | X + 0579.77 | Y − 0474.86 | Z − 0260.21 |
| 0020 | X + 0556.50 | Y − 0475.06 | Z − 0244.09 |
| 0021 | X + 0607.09 | Y − 0467.61 | Z − 0318.66 |
| 0022 | X + 0833.14 | Y − 0472.12 | Z − 0315.83 |
| 0023 | X + 0920.32 | Y − 0477.85 | Z − 0290.35 |
| 0024 | X + 0899.93 | Y − 0494.29 | Z − 0180.37 |
| 0025 | X + 0856.67 | Y − 0506.24 | Z + 0038.22 |
| 0026 | X + 0826.34 | Y − 0405.97 | Z + 0071.16 |
| 0027 | X + 0741.07 | Y − 0199.10 | Z + 0091.20 |
| 0028 | X + 0653.67 | Y − 0129.00 | Z + 0094.64 |
| 0029 | X + 0546.63 | Y − 0093.20 | Z + 0095.73 |
| 0030 | X + 0437.85 | Y − 0062.41 | Z + 0095.85 |
| 0031 | X + 0328.92 | Y − 0032.14 | Z + 0096.26 |
| 0032 | X + 0219.97 | Y − 0001.93 | Z + 0096.90 |
| 0033 | X + 0110.95 | Y + 0027.98 | Z + 0097.48 |
| 0034 | X + 0050.16 | Y + 0043.03 | Z + 0097.90 |
| 0035 | X − 0003.51 | Y − 0012.32 | Z − 0034.17 |
| 0036 | X − 0006.50 | Y − 0013.15 | Z − 0036.49 |
| 0037 | X − 0108.94 | Y − 0013.17 | Z − 0036.50 |
| 0038 | X − 0211.38 | Y − 0013.18 | Z − 0036.51 |
| 0039 | X − 0313.83 | Y − 0013.20 | Z − 0036.53 |
| 0040 | X − 0315.04 | Y − 0001.56 | Z + 0000.70 |
| 0041 | X − 0231.90 | Y − 0020.18 | Z + 0007.02 |
| 0042 | X − 0148.48 | Y − 0037.41 | Z + 0013.48 |
| 0043 | X − 0065.19 | Y − 0055.25 | Z + 0020.08 |
| 0044 | X + 0016.81 | Y − 0078.35 | Z + 0022.57 |
| 0045 | X + 0096.82 | Y − 0106.10 | Z + 0011.53 |
| 0046 | X + 0175.51 | Y − 0134.77 | Z − 0005.23 |
| 0047 | X + 0252.44 | Y − 0165.36 | Z − 0026.28 |
| 0048 | X + 0298.87 | Y − 0157.99 | Z − 0055.40 |
| 0049 | X + 0298.86 | Y − 0186.10 | Z − 0040.75 |
| 0050 | X + 0326.86 | Y − 0199.99 | Z − 0049.89 |
| 0051 | X + 0396.69 | Y − 0243.35 | Z − 0072.81 |
| 0052 | X + 0504.42 | Y − 0368.42 | Z − 0111.34 |
| 0053 | X + 0533.66 | Y − 0446.00 | Z − 0130.78 |
| 0054 | X + 0541.98 | Y − 0485.58 | Z − 0136.84 |
| 0055 | X + 0555.66 | Y − 0484.15 | Z − 0178.82 |
| 0056 | X + 0579.77 | Y − 0474.86 | Z − 0260.21 |
| 0057 | X + 0587.12 | Y − 0475.54 | Z − 0258.89 |
| 0058 | X + 0684.70 | Y − 0481.37 | Z − 0236.93 |
| 0059 | X + 0781.76 | Y − 0487.17 | Z − 0212.74 |
| 0060 | X + 0874.61 | Y − 0495.25 | Z − 0171.76 |
| 0061 | X + 0864.62 | Y − 0507.91 | Z − 0070.80 |
| 0062 | X + 0838.15 | Y − 0508.60 | Z + 0024.58 |
| 0063 | X + 0806.70 | Y − 0426.35 | Z + 0062.14 |
| 0064 | X + 0778.83 | Y − 0330.75 | Z + 0073.30 |
| 0065 | X + 0735.87 | Y − 0241.39 | Z + 0084.08 |
| 0066 | X + 0670.77 | Y − 0165.75 | Z + 0090.51 |
| 0067 | X + 0581.21 | Y − 0123.07 | Z + 0093.53 |
| 0068 | X + 0484.49 | Y − 0096.89 | Z + 0094.13 |
| 0069 | X + 0387.91 | Y − 0070.18 | Z + 0094.61 |
| 0070 | X + 0291.26 | Y − 0043.68 | Z + 0094.85 |
| 0071 | X + 0194.87 | Y − 0016.31 | Z + 0095.26 |
| 0072 | X + 0098.92 | Y + 0012.59 | Z + 0096.24 |
| 0073 | X + 0050.46 | Y + 0027.58 | Z + 0096.43 |
| 0074 | X + 0003.26 | Y + 0042.42 | Z + 0096.66 |
| 0075 | X + 0698.30 | Y − 0156.73 | Z − 0093.04 |
| 0076 | X + 0698.45 | Y − 0187.01 | Z + 0066.74 |
| 0077 | X + 0698.69 | Y − 0195.36 | Z + 0007.57 |
| 0078 | X + 0698.95 | Y − 0219.40 | Z − 0047.63 |
| 0079 | X + 0699.20 | Y − 0250.16 | Z − 0099.40 |
| 0080 | X + 0699.44 | Y − 0289.35 | Z − 0145.09 |
| 0081 | X + 0699.66 | Y − 0336.22 | Z − 0182.87 |
| 0082 | X + 0699.86 | Y − 0389.85 | Z − 0210.11 |
| 0083 | X + 0700.01 | Y − 0447.92 | Z − 0226.06 |
| 0084 | X + 0700.19 | Y − 0479.07 | Z − 0258.05 |
| 0085 | X + 0700.40 | Y − 0470.31 | Z − 0317.68 |
| 0086 | X + 0792.92 | Y − 0298.05 | Z + 0082.54 |
| 0087 | X + 0770.05 | Y − 0298.09 | Z + 0068.84 |
| 0088 | X + 0792.08 | Y − 0298.05 | Z + 0002.25 |
| 0089 | X + 0794.38 | Y − 0298.05 | Z − 0066.96 |
| 0090 | X + 0751.78 | Y − 0298.12 | Z − 0120.59 |
| 0091 | X + 0699.48 | Y − 0298.21 | Z − 0153.42 |
| 0092 | X + 0692.14 | Y − 0298.22 | Z − 0157.44 |
| 0093 | X + 0629.04 | Y − 0298.32 | Z − 0188.05 |
| 0094 | X + 0565.33 | Y − 0298.43 | Z − 0217.42 |
| 0095 | X + 0533.57 | Y − 0298.48 | Z − 0232.30 |
| 0096 | X + 0513.66 | Y − 0298.51 | Z − 0182.13 |
| 0097 | X + 0487.59 | Y − 0298.56 | Z − 0134.87 |
| 0098 | X + 0456.08 | Y − 0298.61 | Z − 0091.06 |
| 0099 | X + 0298.06 | Y − 0023.58 | Z + 0096.43 |
| 0100 | X + 0298.23 | Y − 0054.80 | Z + 0065.45 |
| 0101 | X + 0298.45 | Y − 0069.92 | Z + 0014.80 |
| 0102 | X + 0298.68 | Y − 0085.48 | Z − 0035.71 |
| 0103 | X + 0298.90 | Y − 0102.42 | Z − 0085.77 |
| 0104 | X + 0097.82 | Y − 0009.83 | Z + 0009.44 |
| 0105 | X + 0145.05 | Y − 0020.72 | Z + 0013.82 |
| 0106 | X + 0230.61 | Y − 0016.55 | Z + 0021.00 |
| 0107 | X + 0265.35 | Y − 0014.53 | Z + 0024.86 |
| 0108 | X + 0353.48 | Y − 0032.81 | Z + 0029.89 |
| 0109 | X + 0457.20 | Y − 0060.30 | Z + 0024.59 |
| 0110 | X + 0566.80 | Y − 0097.11 | Z + 0003.79 |
| 0111 | X + 0623.06 | Y − 0118.54 | Z − 0010.25 |
| 0112 | X + 0663.99 | Y − 0135.00 | Z − 0021.30 |
| 0113 | X + 0665.25 | Y − 0134.98 | Z − 0020.45 |
| 0114 | X + 0654.68 | Y − 0105.49 | Z + 0041.67 |
| 0115 | X + 0652.27 | Y − 0103.32 | Z + 0044.99 |
| 0116 | X + 0615.57 | Y − 0088.46 | Z + 0054.52 |
| 0117 | X + 0525.78 | Y − 0056.03 | Z + 0074.64 |
| 0118 | X + 0393.24 | Y − 0018.17 | Z + 0087.99 |
| 0119 | X + 0286.44 | Y + 0005.20 | Z + 0082.86 |
| 0120 | X + 0223.58 | Y + 0003.04 | Z + 0077.82 |
| 0121 | X + 0138.78 | Y − 0000.15 | Z + 0070.40 |
| 0122 | X + 0094.61 | Y + 0009.37 | Z + 0063.54 |
| 0123 | X + 0092.71 | Y + 0009.07 | Z + 0061.15 |
| 0124 | X + 0284.57 | Y + 0003.59 | Z + 0078.06 |

* * * * *